United States Patent [19]

Krückewitt et al.

[11] Patent Number: 4,611,634

[45] Date of Patent: Sep. 16, 1986

[54] HIGH PRESSURE ACCUMULATOR

[75] Inventors: Wilfried Krückewitt, Kahl; Horst Plettner, Hanau, both of Fed. Rep. of Germany

[73] Assignee: Brown, Boveri & Cie AG, Mannheim, Fed. Rep. of Germany

[21] Appl. No.: 655,034

[22] Filed: Sep. 26, 1984

[30] Foreign Application Priority Data

Sep. 26, 1983 [DE] Fed. Rep. of Germany ....... 3334813

[51] Int. Cl.[4] ............................................... F16J 12/00

[52] U.S. Cl. .................................... 138/31; 92/85 A; 92/85 B

[58] Field of Search ..................... 138/30, 31; 92/5 R, 92/85 A, 85 B, 134

[56] References Cited

U.S. PATENT DOCUMENTS

| | | | |
|---|---|---|---|
| 3,095,013 | 6/1963 | Mercier | 138/30 |
| 3,929,163 | 12/1975 | Schon | 138/30 |
| 4,014,213 | 3/1977 | Parquet | 138/30 |
| 4,207,563 | 6/1980 | Soupal | 138/31 |

*Primary Examiner*—Robert E. Garrett
*Assistant Examiner*—Mark A. Williamson
*Attorney, Agent, or Firm*—Herbert L. Lerner; Laurence A. Greenberg

[57] ABSTRACT

A high pressure accumulator for supplying working fluid of a hydraulic control system includes a cylinder, walls disposed on ends of the cylinder, a piston movable within the cylinder defining a space for the working fluid on one side of the piston and a space for gas forming a gas spring on the other side of the piston, a support tube disposed at one of the walls in the gas space, a spring disposed on the support tube, and a stop disposed on the spring for limiting movement of the piston upon the occurrence of a gas loss in the gas space.

7 Claims, 3 Drawing Figures

HIGH PRESSURE ACCUMULATOR

The invention relates to a high-pressure accumulator for supplying the working fluid of a hydraulic control system, including a cylinder containing a piston, with the working fluid on one side of the piston and a gas spring formed by a gas space on the other side, pressure sensors which deliver a signal when certain positions of the piston are reached, and a support tube disposed in the gas space of the cylinder at the end wall of the cylinder, against which the piston comes to rest in the event of a gas loss.

Such high pressure accumulators serve to keep hydraulic oil for a hydraulic system in readiness, especially for an electric high-voltage circuit breaker.

In general, such high-pressure accumulators have an approximately cylindrical body which is gas-tightly closed off at both ends thereof by means of closing covers. In the interior of the cylindrical body there is a piston which separates a gas space from the hydraulic fluid side. On the gas side, the cover is connected to a gas connection for replenishing leakage gas and on the oil side the cover is connected to an oil connection.

In the interior of the body, there is a support tube at the cover located on the gas side, against which the accumulator piston will rest under certain conditions which will be explained further below.

If hydraulic oil is needed, such as for a switching action, the pressurized gas, usually $N_2$, will displace the piston in accordance with the amount of oil removed. If a given amount of oil has been taken out, a pump is set into action which pumps the amount of oil which has been removed back into the accumulator.

The main problem that has to be dealt with is the fact that the gas used as a spring slowly escapes from the gas space, since an absolute seal can be achieved only in the rarest cases. If the full amount of gas is present, the maximum path to be traveled by the piston is accounted for in the cylinder space or the accumulator body in such a manner that the accumulator piston in principle does not hit the support tube if the oil is returned to the accumulator. However, if a certain amount of leakage has occurred, then the accumulator piston can come to rest against the support tube during the filling process. In this case, the filling process is generally carried out in such a way that the pump continues to run for another few seconds beyond the down-control pressure, i.e., a given pressure at which the pump could be shut off because a sufficient amount of oil is in the accumulator again. Then the piston can come to rest against the support tube, as mentioned above. When the piston strikes the support tube, the oil pressure rises considerably faster than before when it only had to compress gas, because of the stiffness of the support tube; in this way, an oil pressure is reached causing an indicator contact to respond and thereby report a leakage of the gas, preferably $N_2$. The other structures have an indicating contact in the gas region, so that there is always an insulated feed-through which should be considered as a weak point or leak. Other conventional devices have proximity switches in the gas region. In all of these embodiments, when the accumulator piston hits the support tube, the need for replenishing gas is signalled.

Since the gas generally does not escape from the gas space very quickly, but rather very slowly, an immediate replenishing of gas when the accumulator hits the support tube, would not be necessary. It would therefore make sense to provide an early warning, i.e., a signal which actually indicates a given case of leakage. If such an early warning was provided with the prior art devices, such as by the use of an indicating contact in the gas region or a proximity switch, the device would be very expensive.

It is accordingly an object of the invention to provide a high pressure accumulator which overcomes the hereinaforementioned disadvantages of the heretofore-known devices of this general type, and in which an early warning signal is given in a given leakage condition, but which is of particularly simple construction.

With the foregoing and other objects in view there is provided, in accordance with the invention, a high pressure accumulator for supplying working fluid of a hydraulic control system, comprising a cylinder, walls disposed on ends of the cylinder, a piston movable within the cylinder defining a space for the working fluid on one side of the piston and a space for gas forming a gas spring on the other side of the piston, means for determining the position of the piston in the cylinder, a support tube disposed at one of the walls in the gas space, a spring disposed on the support tube, and a stop disposed on the spring for limiting movement of the piston upon the occurrence of a gas loss in the gas space.

In accordance with another feature of the invention, the position determining means are in the form of at least one pressure sensor delivering a signal when given positions of the piston are reached.

In accordance with a further feature of the invention, the support tube has an end facing the one wall and another end facing away from the one wall, and including another piston at least partially disposed in the other end of the support tube being partially pushed out of the support tube by the spring, the stop being fastened to the other piston.

In accordance with a concomitant feature of the invention, the pressure sensor measures a pressure in the oil space corresponding to a given position of the stop element and generates an early warning signal signifying that too little gas is present in the gas space due to gas looses.

Other features which are considered as characteristic for the invention are set forth in the appended claims.

Although the invention is illustrated and described herein as embodied in a high pressure accumulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments, when read in connection with the accompanying drawings, in which.

Figure 1:
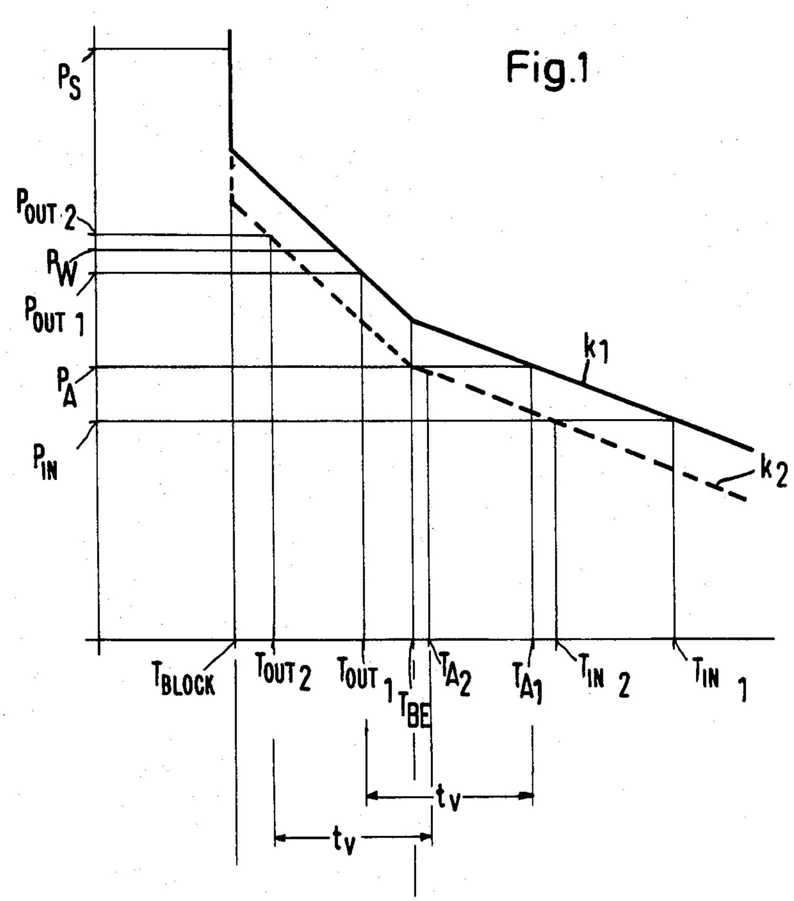
FIG. 1 is a diagram showing the dependence of the pressure in an accumulator on the running time of a pump.
Figure 2:
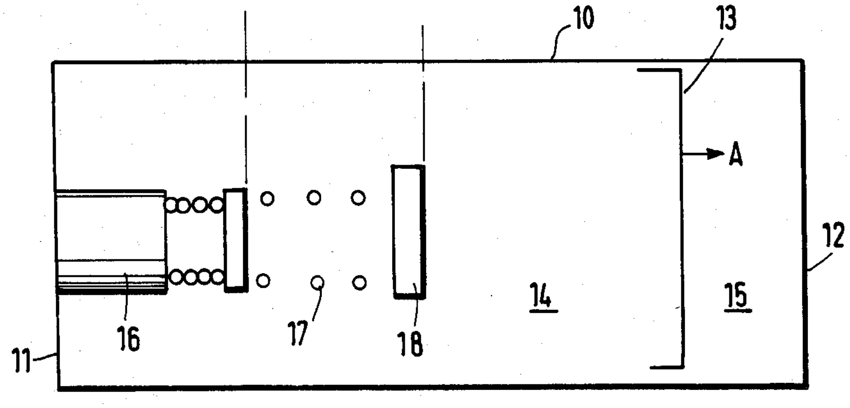
FIG. 2 is a diagrammatic top plan view of the accumulator according to the invention.

Referring now to the figures of the drawings in detail and first, particularly, to FIGS. 1 and 2 thereof, it is seen that FIG. 1 shows a diagram of the pressure versus the running time of a pump for filling a compressed-gas accumulator, and the accumulator is diagrammatically shown in FIG. 2. FIG. 2 shows a cylindrical body 10 which is closed off at both ends thereof by means of covers, walls or end plates 11 and 12. A piston 13 is guided within the cylinder in such a way as to be movable back and forth. The piston 13 separates a space 14 to the left which is filled with gas from a space 15 to the right which is filled with oil. $N_2$ is advantageously used as the gas. A support tube 16 is attached to the left terminating cover 11 and extends along the central axis of the cylinder. A spring 17 is attached to the free end of the support tube 16 and a stop 18 is attached to the free end of the spring 17.

It it is assumed that oil is taken from the space 15, the piston 13 will then move from the position shown in FIG. 2 in the direction of the arrow A. If the piston 13 has reached the point $T_{in1}$ (seen in FIG. 1), the pressure in the space 15 has dropped so far that pressurized oil must be pumped back. The start of the running time of the non-illustrated pump which pumps pressurized oil into the space 15, is therefore $T_{in1}$. If the pump pumps oil, the piston moves against the direction of the arrow A in the direction of the arrow B until the point in time $T_{A1}$ and the corresponding pressure $P_A$ is reached. The pressure $P_{in}$, which corresponds to the start of the running time $T_{in}$ of the pump, is for instance, 330 bar in electric high-voltage circuit breakers. If the pressure $P_A$ is reached in the space 15, the pump could be switched off; the pressure $P_A$ (corresponding to 342 bar) would then be reached definitely, and would be sufficient for optimum operation of a high-voltage circuit breaker. In practice, however, the pump remains switched on and continues to run for a time $t_V$. At the time $T_{out1}$ the pump is shut down finally and a pressure level $P_{out1}$ is reached which is higher than $P_A$. If more oil is then pumped into the space 15, the piston 13 will come to rest on the stop 18 at the point $T_{BE}$. This changes the spring characteristic $K_1$, which was dependent on the gas characteristics alone up to the point $T_{BE}$. This characteristic of the gas is then superimposed on the spring characteristic due to the spring 17, so that the curve $K_1$ has a steeper slope to the left of $T_{BE}$.

If more oil is pumped, the turns of the spring 17 become closer together: the spring 17 becomes rigid, so that the curve $K_1$ rises steeply upward at the point $T_{Block}$ according to the stiffness of the spring and the support tube 16.

It may now be assumed that the slowing-down time $t_V$ of the pump starts at the point $T_{A1}$ at a pressure $P_A$. The run-down time then lasts only until the piston comes to rest against the stop 18, so that the knee bend point $T_{BE}$ of the curve $K_1$ is exceeded. A pressure $P_{out1}$ is then obtained, i.e., a final pressure.

Therefore, if a leak occurs in the gas, the curve $K_1$ will change. The starting position of the piston will shift to the left, so that the motion of the piston starts at $T_{in2}$ for the same pressure $P_E$, i.e. when the pump starts to pump oil. The starting position runs parallel to the curve $K_1$ and below it up to the point $T_{A2}$ at the pressure $P_A$. The slowing-down time $t_V$ begins there, so that the pump continues to run during the time $T_{A2}$ and more specifically so that the piston comes to rest on the spring at $T_{BE}$. The curve $K_2$ then runs parallel to the curve $K_1$ at a steeper angle, where the pressure $P_{out1}$ is exceeded and continues to rise up to the pressure $P_{out2}$. During the process, a certain pressure PW is exceeded which can be considered as the early warning pressure for the condition in which the gas leakage will soon become so large that the piston compresses the spring into a block and thus, the steep region of curves $K_1$ and $K_2$ is reached if the pump continues to pump oil. The purpose of the early warning pressure is to indicate that a critical stage has been reached, at which it is advisable to slowly compensate the leakage losses in the gas, i.e., in the space 14. If the leak becomes still larger, the problem arises that the blocked position $T_{BL}$ of the spring 17 is already reached during the slowing-down time $t_V$, so that the pressure waveform approaches a more vertical shape, i.e., the pressure rises suddenly and very steeply. At a pressure $P_S$ (approximately 370 bar), a further signal is reported which again leads to the blocking of the switch, and the opening of the safety valve. In principle, it should be noted that if the position $T_{Block}$ is reached, the leakage has become so large that in spite of the high pressure it is no longer assured that a sufficient quantity of pressurized oil can be removed. For this reason, hydraulic accumulators in which the piston 13 comes to rest on the support tube 16 are no longer used. The disposition of the spring 17 between the stop 18 and the support tube 16 therefore serves to increase safety; if the pressure $P_W$ is reached or exceeded due to a leak, this indicates that gas must be replenished, but that the operability of the pressurized oil accumulator is not yet limited or reduced.

Figure 3:
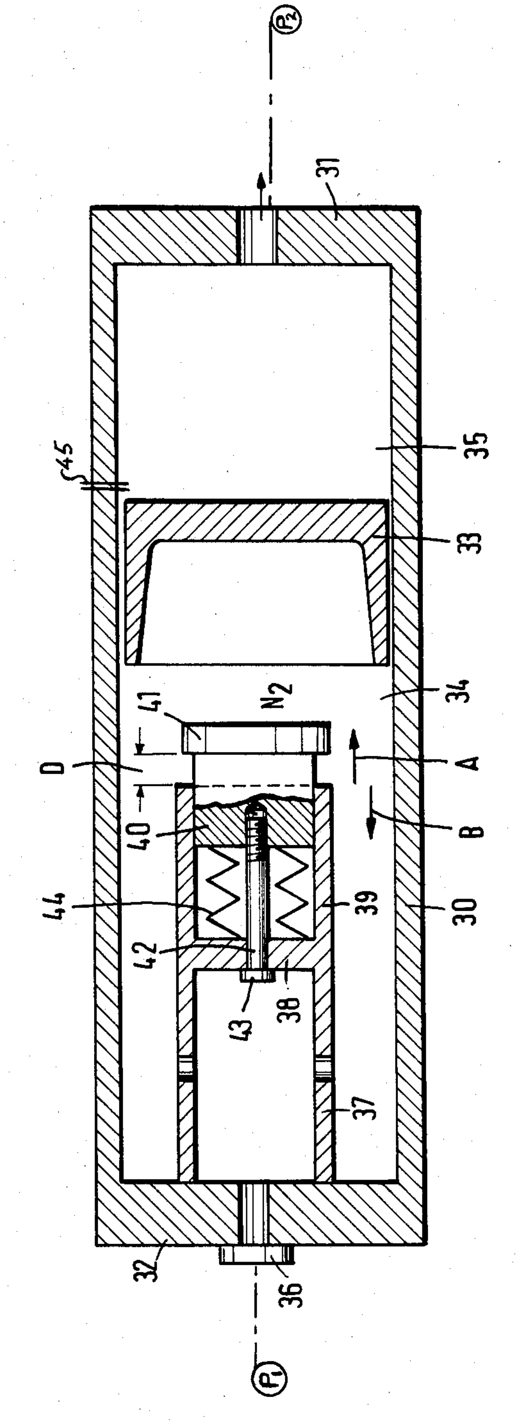
FIG. 3 is a diagrammatic, cross-sectional view of an actual embodiment of the accumulator.

FIG. 3 is a diagrammatic illustration of the mechanical construction of a hydraulic accumulator. In FIG. 3 it is seen that the right hand side of a hydraulic cylinder or accumulator housing 30 is closed off by a cover, wall or end plate 31 and the left hand side thereof is closed off by a cover, wall or end plate 32. An accumulator piston 33 is movably disposed within the accumulator housing 30 and separates a space 34 into which gas is filled from a pressurized oil space 35. The gas can be filled into the space 34 at a feed valve 36. A support tube 37 which has a partition 38 in the central region thereof is attached to the cover 32; the support tube 37 continues beyond the partition 38 with an extension 39. The extension 39 includes a piston 40. A stop 41 is fastened to the piston 40 and guides the piston. The wall or partition 38 is penetrated by a threaded bolt 42 which comes to rest with a nut or screw head 43 thereof against the left hand side of the wall 38 and a free end thereof screwed into the interior of the piston 40. Between the wall 38 and the piston 40 there is a stack of cup springs 44. The motion of the piston 40 in the direction of the arrow A is limited if the nut or screw head 43 hits the wall 38 and the motion of the piston 40 to the left in the direction of the arrow B is limited when the coil turns or spring elements in the stack lie on top of each other. Of course, the distance D between the free end of the support tube 37 or the cylinder 39 and the stop 41 may also correspond to the distance between the points $T_{BE}$ and $T_{Block}$ in FIG. 1. In this case the same result is achieved as in FIG. 2, when the spring 17 becomes a block. Pressure sensors or transducers $P_1$ and $P_2$ are connected to the gas inlet at the valve 36 and/or to the oil outlet as shown in FIG. 3, for delivering a signal when given positions of the piston are reached. As an alternative, feelers 45 with two flexible prongs can extend through the cylinder 30 to register the position of the piston. When the two prongs are pushed together by the piston, a signal is given.

The operation of the hydraulic accumulator according to FIG. 2, explained in connection with FIG. 1, corresponds identically to the operation of the hydraulic accumulator according to FIG. 3, so that this need not be discussed again in detail.

It is of substantial importance to ensure that the piston 33 does not initially run-up on the support tube, but first on the stop 18 or 41, respectively, which is under the pressure of a spring, so that the characteristic of the spring 17 or 44 is superimposed on the gas characteristic. It is therefore possible for the pressure to exceed an early-warning pressure which signals that the leakage in the space 14 has reached a given amount, so that it becomes necessary to replenish the gas as soon as possible.

The foregoing is a description corresponding in substance to German Application No. P 33 34 813.8, dated Sept. 26, 1983, the international priority of which is being claimed for the instant application, and which is hereby made part of this application. Any material discrepancies between the foregoing specification and the aforementioned corresponding German application are to be resolved in favor of the latter.

We claim:

1. High pressure accumulator for supplying working fluid to a hydraulic control system, comprising:

a cylinder;

end walls disposed on ends of said cylinder;

a piston movable within said cylinder defining a working fluid space on one side of said piston for receiving working fluid to be discharged from said working fluid space to the hydraulic control system during a control step of the hydraulic control system and a gas space on the other side of said piston for receiving gas forming a gas spring;

a support tube projecting from one of said end walls into said gas space for limiting movement of said piston when pumping the working fluid back from the hydraulic control system into said working fluid space upon occurrence of gas loss in said gas space;

an abutment element against which said piston abuts during movement of said piston when pumping back the working fluid in said working fluid space upon occurrence of gas loss in said gas space;

spring means disposed between said abutment element and said support tube; and pressure sensor means measuring the pressure in the working fluid corresponding to a given position of said piston after abuting against said abutment element and pressing down said spring means, for generating an early warning signal signifying too little gas being present in said gas space due to gas losses.

2. High pressure accumulator for supplying working fluid of a hydraulic control system, comprising a cylinder, walls disposed on ends of said cylinder, a piston movable within said cylinder defining a space for the working fluid on one side of said piston and a space for gas forming a gas spring on the other side of said piston, a support tube disposed at one of said walls in said gas space, a spring disposed on said support tube, and a stop disposed on said spring for limiting movement of said piston upon the occurrence of a gas loss in said gas space, said support tube having an end facing said one wall and another end facing away from said one wall, and another piston at least partially disposed in said other end of said support tube being partially pushed out of said support tube by said spring, said stop being fastened to said other piston.

3. High pressure accumulator for supplying working fluid of a hydraulic control system, comprising a cylinder, walls disposed on ends of said cylinder, a piston movable with said cylinder defining a space for the working fluid on one side of said piston and a space for gas forming a gas spring on the other side of said piston, a support tube disposed at one of said walls in said gas space, a spring disposed on said support tube, and a stop disposed on said spring for limiting movement of said piston upon the occurrence of a gas loss in said gas space, means for determining the position of said piston in said cylinder, said support tube having an end facing said one wall and another end facing away from said one wall, and another piston at least partially disposed in said other end of said support tube being partially pushed out of said support tube by said spring, said stop being fastened to said other piston.

4. High pressure accumulator for supplying working fluid of a hydraulic control system, comprising a cylinder, walls disposed on ends of said cylinder, a piston movable within said cylinder defining a space for the working fluid on one side of said piston and a space for gas forming a gas spring on the other side of said piston, a support tube disposed at one of said walls in said gas space, a spring disposed on said support tube, and a stop disposed on said spring for limiting movement of said piston upon the occurrence of a gas loss in said gas space, and means for determining the position of said piston in said cylinder, said position determining means being in the form of at least one pressure sensor delivering a signal when given positions of said piston are reached.

5. High pressure accumulator according to claim 4, wherein said pressure sensor measures a pressure in said oil space corresponding to a given position of said piston and generates an early warning signal signifying that too little gas is present in said gas space due to gas losses.

6. High pressure accumulator according to claim 4, wherein said support tube has an end facing said one wall and another end facing away from said one wall, and including another piston at least partially disposed in said other end of said support tube being partially pushed out of said support tube by said spring, said stop being fastened to said other piston.

7. High pressure accumulator according to claim 6, wherein said pressure sensor measures a pressure in said oil space corresponding to a given position of said first-mentioned piston and generates an early warning signal signifying that too little gas is present in said gas space due to gas losses.

* * * * *